United States Patent [19]

Heidrich et al.

[11] Patent Number: 4,591,083
[45] Date of Patent: May 27, 1986

[54] THREADING ARRANGEMENT FOR STRIP-SHAPED MATERIAL

[75] Inventors: Günter Heidrich; Bernd Payrhammer, both of Munich, Fed. Rep. of Germany

[73] Assignee: Agfa-Gevaert AG, Leverkusen, Fed. Rep. of Germany

[21] Appl. No.: 663,993

[22] Filed: Oct. 22, 1984

[30] Foreign Application Priority Data

Nov. 2, 1983 [DE] Fed. Rep. of Germany ....... 3339618

[51] Int. Cl.⁴ ............................................. G03B 1/56
[52] U.S. Cl. .................................... 226/91; 226/15
[58] Field of Search ................ 226/91, 92, 15, 18, 226/19, 104, 113, 114, 119, 196; 242/76, 57.1, 56 R, 195

[56] References Cited

U.S. PATENT DOCUMENTS

| | | | |
|---|---|---|---|
| 2,050,053 | 8/1936 | Graf et al. | 226/91 X |
| 2,950,072 | 8/1960 | Hayashida et al. | 242/76 |
| 3,089,658 | 5/1963 | Good | 242/55.01 |
| 3,181,808 | 5/1965 | Ireland | 242/76 |
| 3,603,522 | 9/1971 | Herrmann | 242/56 R |
| 3,712,558 | 1/1973 | Johnson et al. | 242/195 |
| 4,462,527 | 7/1984 | Taylor et al. | 226/15 |

FOREIGN PATENT DOCUMENTS 1914360 10/1970 Fed. Rep. of Germany .
2244960 3/1974 Fed. Rep. of Germany .

*Primary Examiner*—Leonard D. Christian
*Attorney, Agent, or Firm*—Michael J. Striker

[57] ABSTRACT

In a threading arrangement for strip-shaped material with a timely operating overlapping of gaps of guiding for the material after a supply device for example at treatment locations, particularly at treatment devices for band-shaped photographic layer carrier, a guiding rail is provided for guiding the material at both flat sides and at a side edge, and the guiding rail is movable in the plane of the material transverse to its transporting direction with a guide for the side edge to an overlapping position and after threading from said position.

15 Claims, 4 Drawing Figures

THREADING ARRANGEMENT FOR STRIP-SHAPED MATERIAL

BACKGROUND OF THE INVENTION

The present invention relates to a threading arrangement for strip-shaped material, particularly with timely operating overlapping of gaps of guiding for the material after a supply device, for example, at treating locations, particularly at treating devices for bend-shaped photographic carrier layers.

Arrangements of the above-mentioned general type are known in the art. A threading arrangement for strip-shaped copying material of photographic roller copying devices is known, for example, from the German Auslegeschrift No. 2,244,960. In this arrangement the illuminating opening is overlapped during the time of the threading step by turnable flaps. Such flaps are, however, mechanically complicated, and require, in the event of fully automatic working process, an electronic monitoring in the dark time of the device.

SUMMARY OF THE INVENTION

Accordingly, it is an object of the present invention to provide a threading arrangement which avoids the disadvantages of the prior art.

More particularly, it is an object of the present invention to provide a threading arrangement which is more simple than the known arrangements of this type.

In keeping with these objects and with others which will become apparent hereinafter, one feature of the present invention resides, briefly stated, in a threading arrangment, in which the overlapping is formed as a guiding rail which guides the material at both flat sides and at a side edge and which is movable in the plane of the material and transverse to its transporting direction with a guide for the side edge following to the overlapping position and after threading from the overlapping position.

When the arrangement is designed in accordance with the present invention, the guiding rail which is open at its one side and displaces laterally to the path of the band to be threaded is mechanically simple, forms an upper and a lower guiding plane and allows by different width displacement an adaptation to different material widths.

The novel features which are considered as characteristic for the invention are set forth in particular in the appended claims. The invention itself, however, both as to its construction and its method of operation, together with additional objects and advantages thereof, will be best understood from the following description of specific embrodiments when read in connection with the accompanying drawings.

DESCRIPTION OF A PREFERRED EMBODIMFNT

Figure 1:
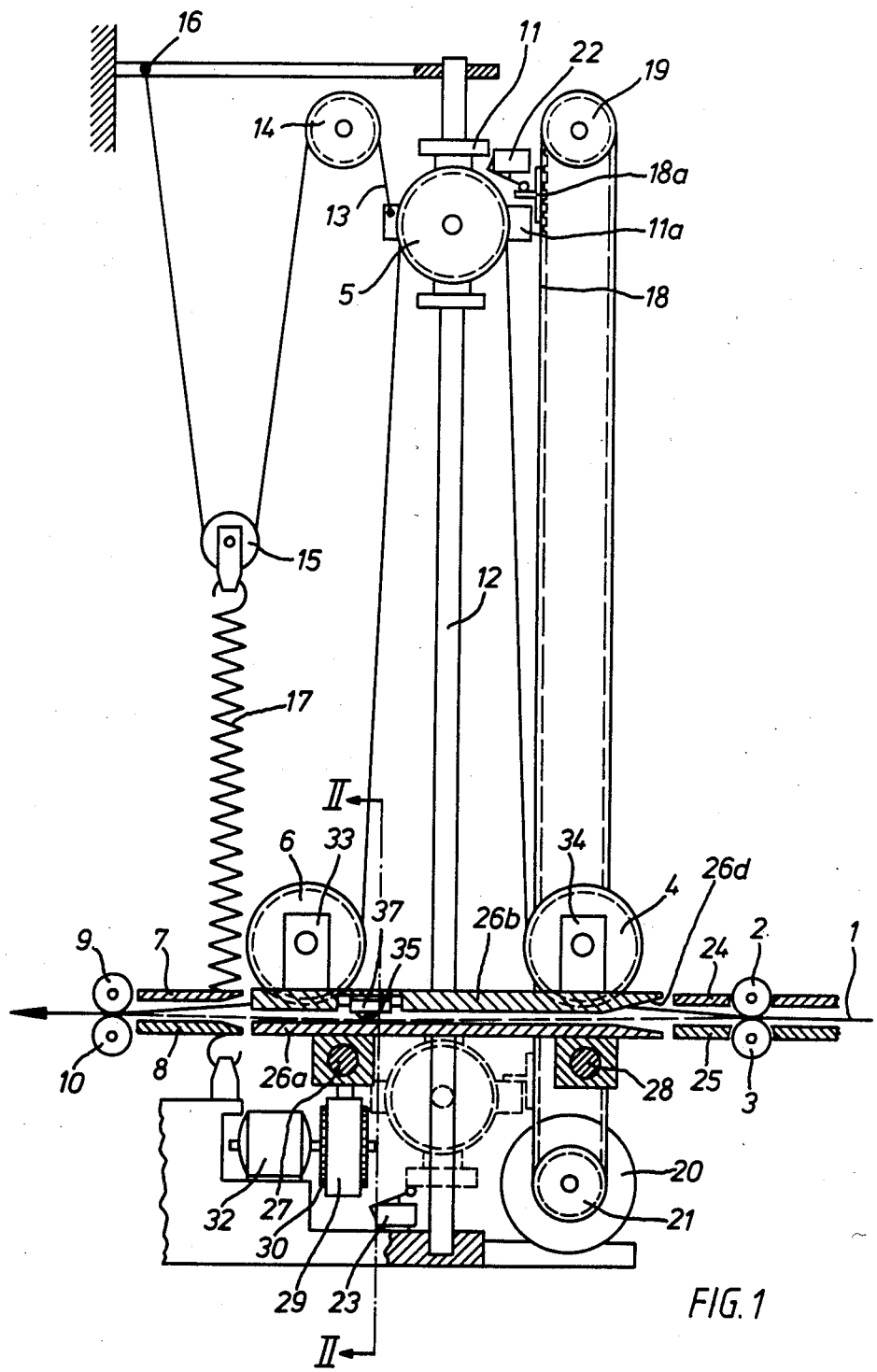
FIG. 1 is a front view of an inventive threading arrangement, partially sectioned.

In a threading arrangement shown in FIG. 1, reference numeral 1 identifies a band-shaped photographic layer carrier which is supplied in FIG. 1 from the right side to the left side. In the present case, the layer carrier 1 is a developed film band with a plurality of copied originals, which is glued together from a greater number of films. The originals to be copied are identified as a rule with an edge notch or a perforation hole which enables stopping of the transportation of this negative in the copying station.

A pair of transporting rollers 2 and 3 are arranged in the beginning of the shown film path. The transporting rollers 2 and 3 rest on one another in a known manner with not a great pressure and serve for displacement also an initial portion of the film band. Along this path the film band runs through a loop puller which is formed by a first lower deviating roller 4, an upwardly displaceable upper deviating roller 5, and a second lower deviating roller 6. After the detour loop is formed by these three rollers, the film 1 is turned back in a substantially horizontal running path along a not shown copying window and between guiding plates 7 and 8 to a further transporting roller pair 9 and 10.

The loop formed by the rollers 4, 5, 6 serves for receiving a longer film piece between a not shown measuring station for the density value of the film to be copied and the copying window. It has been shown that an accurate determination of copying light quantity is possible when for example before the beginning of copying of a film, the measuring values of at least a greater part of the originals of a film are known, as disclosed in the German Patent No. 1,914,360.

The upper deviating roller 5 is arranged on a carriage 11 which is freely movable along a guiding rod 12. The carriage is mounted on an arrangement frame 16 via a rope 13, a deviating roller 14, and a spring-biased further deviating roller 15. Under the action of spring 17 the carriage 11 with a roller 5 is always urged to reach an upper end position. The carriage 11 has a control arm 11a which extends into a path of a movable abutment angle 18a. The abutment angle 18a is mounted on an endless toothed belt 18 which is guided over an upper deviating roller 19 and a toothed roller 21 connected with an electric motor 20.

The upper end position of the abutment anole 18a is controlled by an end switch 22 whose actuation stops the motor 20. The movement of the abutment angle 18a by the toothed belt 18 downwardly leads to the downward displacement of the carriage 11 with the roller 5 until the motor is stopped in the lower end position by an end switch 23. In this position the roller 5 is located at least several millimeters under the film guiding plane.

Figure 2:
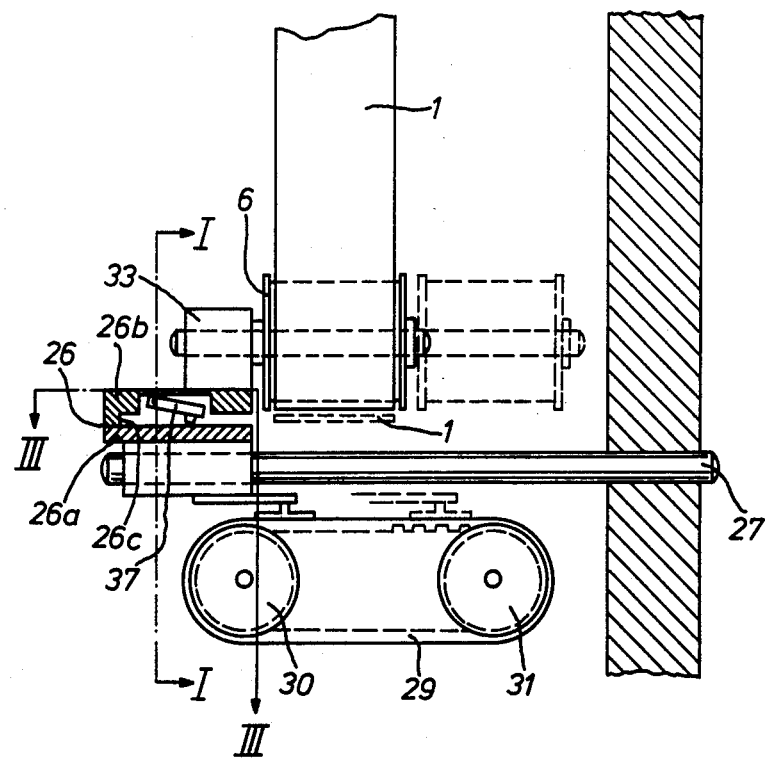
FIG. 2 is a side view of the part of the inventive threading arrangement of FIG. 1, taken along the line II—II in FIG. 1.

For threading the film from guiding plates 24 and 25 behind the transporting rollers 2 and 3 until its running into the guiding plates 7 and 8 during the threading phase, a guiding rail 26 is provided. The guiding rail 26 has a shape shown in FIG. 2 with a lower guiding surface 26a, an upper guiding surface 26b and a guiding surface 26c for the film side edge facing away from the device. Furthermore, it has a funnel-shaped extension 26d which is shown in FIG. 1 and provided at the inlet side.

The guiding rail 26 is supported displaceably, parallel to the film plane and normal to the movement direction of the film, on guiding rods 27 and 28. This guiding rail is displaced by an endless toothed belt 29 guided over two toothed wheels 30 and 31 and driven by a stepping motor 32. It can also turn about a respectively located turning point in the film plane.

Two bearing blocks 33 and 34 are mounted on the guiding rail 26. The lower deviating rollers 4 and 6 are rotatably supported in the bearing blocks 33 and 34.

Figure 3:
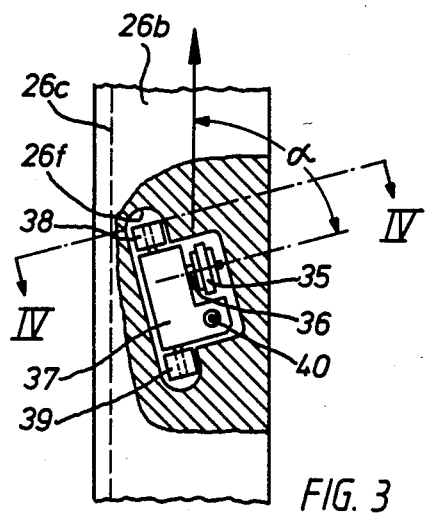
FIG. 3 is a plan view of a segment of the inventive threading arrangement, taken along the line III—III in FIG. 2.
Figure 4:
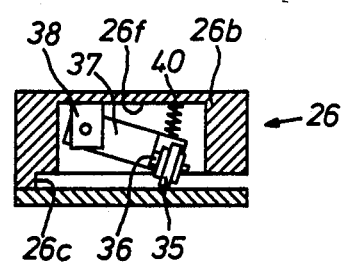
FIG. 4 is a transverse section through a guiding, rail of the inventive threading arrangement of FIG. 3, taken along the line IV—IV in FIG. 3.

As can be seen from FIGS. 3 and 4, a recess 26f is provided in the upper guiding surface 26b of the guiding rail 26. A guiding roller 35 is freely rotatably supported on an axle 36 in the recess 26f. The guiding roller 35 is provided with a coating having a high friction value. An axle 36 of the guiding roller 35 is inclined at an angle of between 60° and 85° to the displacement direction of the film 1, particularly of 70°, so that the force applied by the roller on the film always displaces the film on the guiding surface 26c. In addition, the roller axle 36 with an axle carrier 37 is supported turnably between bearing lugs 38 and 39, and a spring 40 constantly presses the guiding roller 35 against the film 1.

The operation of the above-described threading arrangement is as follows:

After the passage of a film end, the upper deviating roller 5 assumes the position shown in FIG. 1. With the command for threading, the motor 20 moves the abutment angle 18a via the toothed belt 18 to the lower end position shown in broken lines, and the carriage 11 with the upper deviating roller 5 also moves downwardly. The spring 17 is tensioned. By the preselection of the respective film width it is determined in which position the stepping motor 32 moves the guiding rail 26. The programming of the motor 32 is performed so that in the working phases of the device in which no threading is required, the guiding rail 26 is withdrawn to its position maximum remote from the device. The lower rollers 4 and 6 connected with the rail 26 are located then in a position which is required for guiding the film through the loop. For threading a film of a certain width, the guiding rail 26 is now moved, starting from its zero position, by a certain number of steps toward the device until the guiding surface 26 for the film side edge facing away from the device is in such a position that the film center runs over the center of the film guiding path.

When now the film is displaced by the transporting rollers 2 and 3 between the plates 24 and 25 in the funnel-shaped extension 26d of the guiding rail 26, the film runs until reaching the guiding roller 35 in a certain distance from the lateral guiding surface 26c. Under the action of the inclinely running guiding roller 35, the film after a short running path is brought with its left lateral edge, as seen in the running direction to abutment against the guiding surface 26c. During a further threading step the initial portion of the film reaches the space between the guiding plates 7 and 8 and finally the transporting rollers 9 and 10. A sensor is arranged here and shows that the threading process is finished.

For making the device ready to operate, the guiding rail 26 is withdrawn by the step motor 32 to its inoperative position remote from the device, and the lower deviating rollers 4 and 6 assume their position which is proper for the loop formation. By positioning of the turning axle 38a, the coating of the roller does not cause friction resistance to sliding of the film 1 from the rail 26, since the roller is somewhat lifted.

Simultaneously the motor 20 displaces the abutment angle 18a to the shown upper end position, so that with the started film transportation as a result of the continuous testing of the film in the measuring station the upper deviating roller 5 is continuously pulled upwardly under the action of the spring 17. As long as a certain film length is retained in the loop, whose measuring value allows an acceptable measurement of the copying light quantity, the copying process in the not shown copying window starts. The sensing is performed always somewhat faster than the reduction of the loop by the copying process so that the sensing process is occasionally interrupted when the loop reaches its maximum size.

The guiding rail 26 has such a width that at least the film to be treated with a smallest width is completely received therein. Due to the guiding roller 35, the guiding rail does not have a width corresponding to the wider film formats. It suffices when the film is guided to approximately two-thirds inside this channel open at its one side. This is of a great advantage especially in the event of repeated orders with sealed-on data strips or guide strips, since such a repeated order strip has a width considerably extending beyond the conventional film width.

Mounting of the lower deviating rollers 4 and 6 on the guiding rail 26 allows arrangement of the upper guiding surfaces in the region which is required for the guiding rollers 4 and 6. Simultaneously these rollers 4 and 6 support the threading process in the event of especially wide films or film with carrier bands for the repeated orders.

It will be understood that each of the elements described above, or two or more together, may also find a useful application in other types of constructions differing from the types described above.

While the invention has been illustrated and described as embodied in a threading arrangement for a strip-shaped material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A threading arrangement for a strip-like material with a timely overlapping of gaps of guidance for the material after a supply device for example at treatment locations particularly at treatment devices for band-shaped photographic layer carrier, the arrangement comprising overlapping means formed as a guiding rail to guide the material both flat sides and the material side edge, said guiding rail having a guiding surface for the side edge, said guiding rail with said guiding surface being movable in a plane of the material and transverse to a transporting direction of the material to an overlapping position for threading the material, and after threading from said overlapping position to a working position.

2. An arrangement as defined in claim 1, wherein said rail has guiding surfaces for flat sides of the material, said guiding surface for the side edge being movable in correspondence with a respective material width in different threading positions, and said guiding surfaces for the flat sides only partially overlapping wider material widths.

3. An arrangement as defined in claim 2; and further comprising means for moving said guiding rail to a respective overlapping position and including a stepping motor and a toothed belt drive and arranged to transport said guiding rail from an inoperative position by a number of steps corresponding to each material width.

4. An arrangement as defined in claim 1, wherein one of said guiding surfaces for the flat sides has a recess; and further comprising a freely rotatable guiding roller accommodated in said recess, inclined to said guiding surface for the lateral edge and provided with a coating of a high friction value.

5. An arrangement as defined in claim 4, wherein said guiding surfaces for the flat sides include an upper guiding surface and a lower guiding surface, said recess and said roller being provided in said upper guiding surface.

6. An arrangement as defined in claim 4, wherein said guiding roller has an axis inclined at an angle of 60°–85° to the transporting direction.

7. An arrangement as defined in claim 6, wherein said axis of said guiding roller is inclined at an angle of 70° to the transporting direction.

8. An arrangement as defined in claim 4, wherein said guiding roller has an axis which is turnable about a turning axis located between said guiding roller and said guiding surface for the side edge.

9. An arrangement as defined in claim 4; and further comprising means for spring-biasing of said guiding roller toward the material.

10. An arrangement as defined in claim 1, wherein said guiding rail has an inlet side and a funnel-shaped widened portion at said inlet side.

11. An arrangement as defined in claim 1, wherein said guiding rail is displaceable transversely to the material transporting direction; and further comprising guiding rods along which said guiding rail is displaceable, an endless toothed belt, and a stepping motor coupled with said guiding rail via said endless toothed belt.

12. An arrangement as defined in claim 1; and further comprising a loop-forming device including a first roller movable relative to and above the material plane and two further rollers which are not movable relative to the material plane.

13. An arrangement as defined in claim 12; and further comprising a guiding member and a spring arranged to move upwardly said first movable roller along said guiding member.

14. An arrangement as defined in claim 13; and further comprising a motor-driven abutment for said first movable roller and movable to a position in which said movable roller is located under said guiding rail.

15. An arrangement as defined in claim 12, wherein said not movable rollers are arranged on said guiding rail and movable together with the latter parallel to the material plane.

* * * * *